United States Patent [19]

Tanis

[11] Patent Number: 5,234,961
[45] Date of Patent: Aug. 10, 1993

[54] POLYURETHANE WATER-BLOWN INTEGRAL SKIN SYSTEM PRODUCED WITH A POLYTERAHYDROFURAN PREPOLYMER

[75] Inventor: Rick A. Tanis, Wyandotte, Mich.

[73] Assignee: BASF Corporation, Parsippany, N.J.

[21] Appl. No.: 986,318

[22] Filed: Dec. 7, 1992

[51] Int. Cl.$^5$ ................................................ C08J 9/34
[52] U.S. Cl. ...................................... 521/51; 521/117; 521/137; 521/159
[58] Field of Search ................. 521/51, 117, 137, 159

[56] References Cited

U.S. PATENT DOCUMENTS 5,132,329  7/1992  Lynch et al. .......................... 521/51

*Primary Examiner*—Morton Foelak
*Attorney, Agent, or Firm*—Martin P. Connaughton

[57] ABSTRACT

The present invention relates to water blown integral skin polyurethane foams. These foams are prepared using a diphenylmethane diisocyanate:polytetrahydrofuran prepolymer. The polyurethane foams prepared with this prepolymer exhibit improved abrasion resistance and cold flex characteristics when compared to water blown integral skin foams prepared without the prepolymer. These foams are suitable for use in shoe sole applications.

3 Claims, No Drawings

POLYURETHANE WATER-BLOWN INTEGRAL SKIN SYSTEM PRODUCED WITH A POLYTERAHYDROFURAN PREPOLYMER

FIELD OF THE INVENTION

The present invention relates to an integral skin polyurethane foam. In particular the invention relates to a water blown integral skin foam having improved resistance to abrasion and cold flex properties and the process for its preparation. This improvement is accomplished by using a polytetrahydrofuran (polyTHF) modified diphenylmethane diisocyanate. The integral skin foams of the present invention are particularly useful in shoe sole application.

DESCRIPTION OF THE RELATED ART

Integral skin foams are well known to those skill the art of polyurethane foams. Such foams have a cellular interior and a higher density microcellular or non-cellular skin. In general, to prepare such foams one reacts an organic isocyanate with a substance having at least one isocyanate reactive group in the presence of a catalyst, blowing agent, and a variety of optional additives. The reaction is carried out in a mold where a higher density skin forms at the interface of the reaction mixture and the inner surface of the mold.

At the present time, the most common type of blowing agent used in integral skin polyurethane foams is chlorofluorocarbons (CFC) or combinations of CFCs and other blowing agents. Industry today, however, is faced with a mandate to reduce and eventually eliminate the use of CFCs. To this end much energy is being devoted.

G.B. Patent No.1 1,209,297 teaches the use of a combination blowing agent consisting of a CFC and hydrate of an organic compound which splits off water at temperatures above 40° C. This blowing agent or combination of agents was used in a formulation with a suitable polyisocyanate a polyol containing hydroxyl groups and a catalyst. This patent discloses the undesirability of having free water in the system. The patent states that the presence of even small quantities of water produce a skin which is permeated with fine cells.

U.S. Pat. No. 4,305,991 describes a process for preparing integral skin polyurethane foams wherein a polyisocyanate, containing aliphatically and/or cycloaliphatically bound isocyanate groups, is reacted with polyhydroxyl compounds containing ether linkages, a chain extender, a catalyst, additives and a blowing agent. The blowing agent is characterized as a readily volatile organic substance. Examples of which include both halogenated and nonhalogenated volatile organic compounds, to which water may be added as a chemical blowing agent.

More recently, attempts have been made to evaluate the performance of alternate blowing agents to CFCs. In a paper by J. L. R. Clatty and S. J. Harasin entitled, *Performance of Alternate Blowing Agents to Chlorofluorocarbons in RIM Structural and Elastomeric Polyurethane Foams*, presented to the 32nd Annual Polyurethane Technical/Marketing Conference, October 1989, the authors addressed the use of water as a blowing agent for integral skin polyurethane reaction injection molded systems (RIM). In this application, the water concentration in the system is controlled by the concentration and type of molecular sieves used. As in the Great Britain patent discussed previously, the water is not in a free form but bound in some manner. In this instance, the authors state that this process is limited to use in rigid foam systems and the flexible integral skin formulations may best be served by using HCFCs or HCFC-22 as substitutes for CFCs.

U.S. Pat. No. 5,132,329 describes a process for preparing a flexible, low density integral skins foam using water as the exclusive blowing agent. However, most water-blown integral skins have this skin, poor abrasion resistance, and poor flex properties. An additional problem with water-blown formulations, specifically in shoe sole applications, is the narrow processing range. Typical systems require tight molds and unique venting configurations. In some instances, skin delamination occurs due to insufficient mold clamping pressure. Substitution of the polyTHF-modified diisocyanate alleviates these problems. A typical formulation utilizing the polyTHF modified diisocyanate produces a shoe sole having excellent cold flex properties and abrasion resistance. Further, successful handmixed parts were poured in loose molds in partially clamped molds.

DETAILED DESCRIPTION OF THE INVENTION

The instant invention relates to a process for the production of flexible integral skin polyurethane foams and the integral skin foams themselves.

It is the object of the present invention to provide a flexible integral skin polyurethane foam having improved abrasion resistance and flex properties in comparison to other water-blown integral skin foams. The process for said invention comprises reacting:

A) a polyTHF modified polyisocyanate, with
B) compounds bearing hydrogen atoms reactive with isocyanate groups and having an average functionality of at least 1.5 and further containing ether linkages,
C) water,
D) an effective amount of a polyurethane promoting catalyst,
E) an alcohol having from 10 to about 20 carbons,
F) a surfactant, and,
G) a chain extender. Optional additives may be added.

In general, potential applications for this material include, but are not limited to, automotive parts such as steering wheels, armrests, horn covers, headrests, or trim and non-automotive applications not limited to shoe soles, gaskets, or furniture parts.

The isocyanate used in the present invention is a prepolymer formed from the reaction product of polyTHF and a diphenylmethane diisocyanate. The isocyanates used are prepared by conventional methods known in the art such as the phosgenation of the corresponding amines. The diphenylmethane diisocyanate used in conjunction with the polyTHF to form the desired prepolymer is an isomeric mixture of 4,4'-, 2,4'-, and 2,2'-diphenylmethane diisocyanate. The isomer mixtures can be controlled by the manufacturing procedure to give from 100 percent of the 4,4'-isomer to mixtures containing as much as 90 percent of the 2,4-isomer with the remainder being 4,4'- and a minor amount of 2,2'-(<1%). Preferably, the diphenylmethane diisocyanate mixture used has an isomer mixture of from 49 percent 4,4'- to 100 percent 4,4'-; 2 percent 2,4-; to 50 percent 2,4- and not greater than one percent 2,2'-. Most preferably, the isomer mixture is 98 percent 4,4'- and 2 percent 2,4'-diphenylmethane diisocyanate.

The polyTHF is prepared by conventional means known in the art. The polymerization of tetrahydrofuran (THF) is a classic example of cationic ring opening addition polymerization. PolyTHF is a low melting, crystallizable polymer and is characterized by a low glass transition temperature. It is possible to make polyTHF of almost any molecular weight. However, for purposes of the present invention, molecular weights ranging from 250 to 2,000 are preferred. Prepolymers prepared using a 1,000 molecular weight polyTHF are most preferred.

The prepolymer is formed by reacting an excess of the isocyanate with the polyTHF. The manufacturing process is well known in the art. In general for most "no cook" type prepolymers, the process is straight forward. The polyol is added with agitation to a stoichiometric excess of isocyanate in a reactor at from 50° C. to 100° C. for about two hours. The mixture is held at the predetermined reaction temperature until completion of the reaction. Many varieties are possible in the processing depending on the raw materials used and the types of prepolymers desired. A preferred prepolymer of the present invention consists of the reaction product of an excess of a diphenylmethane diisocyanate containing at least 98 percent 4,4'-isomer and a 1,000 molecular weight polyTHF.

Any suitable polyoxyalkylene polyether polyol may be used to react with the diisocyanate prepolymers such as those resulting from the polymerization of a polyhydric alcohol and an alkylene oxide. Representatives of such alcohols may include ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, or 1,2,6-hexanetriol. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures, epihalohydrins such as epichlorohydrin, as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols and copolymer glycols prepared from blends or sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257-262, published by Interscience Publishers, Inc. (1951) or in U.S. Pat. No. 1,922,459.

Other polyoxyalkylene polyether polyols which may be employed are those which contain grafted therein vinylic monomers.

The polyols which have incorporated therein the vinylic polymers may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092; 4,014,846; 4,093,573; and 4,122,056, the disclosures of which are herein incorporated by reference, or (3) by low temperature polymerization in the presence of chain transfer agents. These polymerizations may be carried out at a temperature between 65° C. and 170° C., preferably between 75° C. and 135° C.

The amount of ethylenically unsaturated monomer employed in the polymerization reaction is generally from one percent to 60 percent, preferably from 10 percent to 40 percent, based on the total weight of the product. The polymerization occurs at a temperature between about 80° C. and 170° C., preferably from 75° C. to 135° C.

The polyols which may be employed in the preparation of the graft polymer dispersions are well known in the art. Both conventional polyols essentially free from ethylenic unsaturation such as those described in U.S. Pat. No. Re. 28,715 and unsaturated polyols such as those described in U.S. Pat. Nos. 3,652,659 and Re. 29,014 may be employed in preparing the graft polymer dispersions used in the instant invention, the disclosures of which may be employed are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927, and 3,346,557, the disclosures of which are incorporated by reference.

The unsaturated polyols which may be employed for preparation of graft copolymer dispersions may be prepared by the reaction of any conventional polyol such as those described above with anorganic compound having both ethylenic unsaturation and a hydroxyl, carboxyl, anhydride, isocyanate or epoxy group or they may be prepared by employing an organic compound having both ethylenic unsaturation an a hydroxyl, carboxyl, anhydride, or epoxy group as a reactant in the preparation of the convention polyol. Representative of such organic compounds include unsaturated mono and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene monoxide, butadiene monoxide, vinyl glycidyl ether, glycidyl methacrylate and 3-allyloxpropylene oxide.

As mentioned above, the graft polymer dispersions used in the invention are prepared by the in situ polymerization of an ethylenically unsaturated monomer or a mixture of ethylenically unsaturated monomers, either in a solvent or in the above-described polyols. Representative ethylenically unsaturated monomers which may be employed in the present invention include butadiene, isoprene, 1,4-pentadiene, 1,5-hexadiene, 1,7-octadiene, styrene, a-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl-4-vinylbenzoate, phenoxystyrene, p-vinyldiphenylsulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl a-chloroacrylate, ethyl a-ethoxyacrylate, methyl a-acetam; inoacrylate, buty acrylate, 2-ethylhexyl acrylate, phenyl acrylate, phenyl methacrylate, a-chloroacrylonitrile, methacrylonitrile, N,N-dimethylacrylamide, N,N-dibenzylacrylamide, N-butylacrylamide, N,N-dibenzylacrylamide, N-butylacrylamide, methacryl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl fluoride, vinylidene bromide, 1-chloro-1-fluoroethylene, vinylidene fluoride, vinyl methyl ether, vinyl ethyl ether, vinyl propyl ether, vinyl butyl ether, vinyl 2-ethylhexyl ether, vinyl phenyl ether, vinyl 2-butoxyethyl ether, 2,4-dihydro-1,2-pyran, 2-butoxy-2'-vinyloxy diethyl ether, vinyl 2-ethylthioethyl ether, vinyl methyl ketone, vinyl ethyl ketone, vinyl phenylketone, vinyl phosphonates such as bis(b-chloroethyl)vinyl phosphonate, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinylsulfone, methyl vinylsulfone, N-vinyl pyrrole, and the like; dimethyl fumarate, dimethyl maleate, maleic acid, crotonic acid, fumaric acid, itaconic acid, monomethyl itaconate, butylaminoethyl methacrylate, dimethylaminoethyl methacrylate, glycidyl acrylate, allyl alcohol, glycol monoesters of itaconic acid, dichlorobutadine, vinyl pyridine, and the like. Any of the known polymerizable monomers can be used and the compounds listed above are illustrative and not restrictive of the monomers suitable for us in this invention. Preferably, the monomer is selected from the group consisting of acrylonitrile, styrene, methyl methacrylate and mixtures thereof.

Illustrative initiators which may be employed for the polymerization of vinyl monomers are the well-known free radical types of vinyl polymerization initiators, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumeme hydroperoxide, paramenthane hydroperoxide, di-a-cumyl peroxide, dipropyl peroxide, diisopropyl peroxide, difuroyl peroxide, ditriphenylmethylperoxide, bis(p-methoxybenzol)peroxide, p-monoethyoxybenzolylperoxide, rubene peroxide, ascaridol, t-butyl peroxybenzoate, diethyl peroxyterephthalate, propylhydroperoxide, isopropyl hydroperoxide, n-butyl hydroperoxide, t-butyl hydroperoxide, cyclohexyl hydroperoxide, trans-declaim hydroperoxide, a-methylbenzyl hydroperoxide, a-methyl-a-ethyl benzyl hydroperoxide, tetralin hydroperoxide, triphenylmethyl hydroperoxide, diphenylmethylhydroperoxide, a-a'-azo-bis(2-methyl) butyronitrile, a,a'-azo-bis(2-methyl) heptonitrile, 1,1-azo-bis(1-cyclohexane) carbonitrile, dimethyl a,a'-azobis(isobutyronitrile), 4,4'-azo-bis(4-cyanopetanoic)acid, azo-bis(isobutyronitirle), 1-t-amylazo-1-cyanocyclohexane, 2-t-butylazo-2-cyany-4-methoxy-4-methylpentane, 2-t-butylazo-2-cyano-4-methylpentane, 2-(t-butylazo)isobutyronitirle, 2-t-butylazo-2-cyanobutane, 1-cyno-1-(t-butylazo)cyclohexane, t-butyl peroxy-2-ethylhexanoate, t-butylperpivalate, 2,5-dimethyl-hexane-2,5-diper-2-ethyl hexoate t-butylperneo-decanoate, t-butylperbenzoate, t-butyl percrotonate, persuccinic acid, diisopropyl peroxydicarbonate, and the like; a mixture of initiators may also be used. Photochemically sensitive radical generators may also be employed. Generally from about 0.5 percent to about 10 percent, preferably from about 1 percent to about 4 percent, by weight of initiator based on the weight of the monomer will be employed in the final polymerization.

Stabilizers may be employed during the process of making the graft polymer dispersions. One such example is the stabilizer disclosed in U.S. Pat. No. 4,148,840 which comprises a copolymer having a first portion composed of an ethylenically unsaturated monomer or mixture of such monomers and a second portion which is a propylene oxide polymer. Other stabilizers which may be employed are the alkylene oxide adducts of copolymers of styrene-allyl alcohol.

The preferred polyols are polyethers having an average functionality of about 1.75 to about 3.0 and a molecular weight range of from about 4000 to about 5000. The most preferred polyols are polyethers which are copolymers of ethylene oxide and propylene oxide having a diol or triol initiator such as propylene glycol or glycerine.

Any suitable catalyst may be used including tertiary amines such as, triethylenediamine, N-methylmorpholine, N-ethylmorpholine, diethylethanolamine, N-cocomorpholine, 1-methyl-4-dimethylaminoethylpiperazine, methoxypropyldimethylamine, N,N,N'-trimethylisopropyl propylenediamine, 3-diethylaminopropyldiethylamine, dimethylbenzylamine, and the like. Examples of such commercially available catalyst is the DABCO ® series available through Air Products, Corp. Other suitable catalysts are, for example, dibutyltin dilaurate, dibutyltindiacetate, stannous chloride, dibutyltin di-2-ethyl hexanoate, stannous oxide, available under the FOMREZ ® trademark, as well as other organometallic compounds such as are disclosed in U.S. Pat. No. 2,846,408

An alcohol having from about 10 to about 20 carbons or mixtures thereof, is used according to the present invention. Alcohols of this type are known to those skilled in the art. The types of alcohols contemplated are commonly produced via the oxo process and are referred to as oxo-alcohols. Examples of some commercially available products include LIAL 125 from Chimica Augusta SpA or NEODOL ® produced by Shell.

A surface active agent is necessary for production of integral skin polyurethane foam according to the present invention. Surfactants which may be used are those which aid in homogenizing the initial materials and may also be suitable for regulating cell structure. Typical examples are foam stabilizers such as siloxane oxyalkylene heterol polymers and other organic polysiloxanes, oxyethylated alkyl phenol, oxyethylated fatty alcohols, paraffin oils, castor oil ester, phthalic acid esters, ricindolic acid ester, and Turken red oil, as well as cell regulators such as paraffins.

Chain extending agents employed in the preparation of integral skin polyurethane foams include those having two functional groups bearing active hydrogen atoms. A preferred group of chain extending agents includes ethylene glycol, diethylene glycol, propylene glycol or 1,4-butanediol.

Additives which may be used in the process of the present invention include known pigments, such as carbon black, dyes and flame retarding agents (e.g., tris-chloroethyl phosphates or ammonium phosphate and polyphosphate), stabilizers against ageing and weathering, plasticizers, such as gamma butyrolactone; fungistatic and bacteriostatic substances, and fillers.

The main blowing and density controlling agent used according to the present invention is water. For the purpose of the invention water is present in amounts up to and including 1.0 weight percent based on the total weight of the nonisocyanate components. It is preferably present in amounts from about 0.4 to 1.0 weight percent based on the total of the nonisocyanate components.

The mechanical parameters of the instant process are flexible and depend on the final application of the integral skin polyurethane foam. The reaction system is versatile enough that it may be made in a variety of densities and hardness. The system may be introduced into a mold in a variety of ways known to those skilled in the art. It may be shot into a preheated closed mold via high pressure injection technique. In this manner it processes well enough to fill complex molds at low mold densities (from 18 pcf to 25 pcf). It may also be run using a conventional open mold technique wherein the reaction mixture or system is poured or injected at low pressure or atmospheric pressure into a preheated open mold. In the instant process the system may be run at mold temperatures from about 85° F. to about 120° F. with from about 90° F. to about 110° F. being preferred.

Having thus describe the invention, the following examples are given by way of illustration.

Polyol A is a glycerine initiated polyoxypropylene-polyoxyethylene block copolymer having a hydroxyl number 27.5 and a molecular weight of about 5050.

Polyol B is a 1:1 acrylonitrile:styrene copolymer constituting 30 weight percent solids dispersed in a trimethylolpropane initiated polyoxypropylene-polyoxyethylene block copolymer having a hydroxyl number of 35 and molecular weight of about 4121.

Polyol C is a dipropylene glycol initiated polyoxy-propylene-polyoxyethylene block copolymer having a hydroxyl number of 29 and a molecular weight of 3473.

Dabco 1027 is a delayed action amine catalyst available from Air Products.

BL-17 is an acid blocked amine catalyst available from Air Products.

X2-5384 is a silicone surfactant available from Dow.

LIAL 125 is a $C_{12}$-$C_{15}$ oxoalcohol available from Chimica Augusta SpA.

UL-1 is an organotin catalyst available under the FOMREZ ® trademark.

ISO 1 is an isocyanate prepolymer mixture consisting of the reaction product of 65 weight percent of an essentially pure 4,4'-diphenylmethane diisocyanate and 29 weight percent of a 2:1 blend of a trimethylol-propane initiated polyoxypropylene-polyoxyethylene block copolymer and a propylene glycol initiated polyoxypropylene polymer, and blended therein 6 weight percent of a carbodiimide modified 4,4'-diphenylmethane diisocyanate.

ISO 2 is a isocyanate prepolymer consisting of the reaction product of 51 weight percent of an essentially pure 4,4-diphenylmethane diisocyanate and 49 weight percent of a 1000 molecular weight polytetrahydrofuran.

TABLE 1

|  | 1 | 2 |
| --- | --- | --- |
| Polyol A | 65.48 | 65.48 |
| Polyol B | 10.00 | 10.00 |
| Polyol C | 16.00 | 16.00 |
| Ethylene Glycol | 5.00 | 5.00 |
| DABCO 1027 | 1.10 | 1.10 |
| BL-17 | 0.50 | 0.50 |
| X2-5384 | 0.60 | 0.60 |
| LIAL 125 | 0.70 | 0.70 |
| UL-1 | 0.02 | 0.02 |
| Water | 0.60 | 0.60 |
| Iso 1 | 100 Index | — |
| Iso 2 | — | 100 Index |
| Physical Characteristics |  |  |
| Molded Density pcf | 34 | 35 |
| Taber Abrasion (mg loss) | 160 | 11 |
| Rossflex |  |  |
| @ 0° F. | Failure @ 90K cycles | >150K cycles (no cut growth) |
| @ −20° F. | Failure @ 100K cycles | >150K cycles (no cut growth) |

PROCEDURES

Samples were prepared as handmixes using an open pour technique. Appropriate amounts of the polyol resin components were weighed into a suitable container. A predetermined amount of iso was added and the blend was mixed for approximately 10 seconds using a high speed mixer equipped with a German mix blade. The mixtures were then poured into a clean dry 12"×6×⅛ plaque mold. The mold was shut and the part allowed to cure. The samples were demolded and tested for abrasion resistance and flex properties.

Sample 1, a typical water blown integral skin formulation shows poor resistance to abrasion and flex failure at less than 100 Kcycles. On the other hand sample 2 shows good abrasion resistance and showed no flex failure even at 150 Kcycles.

Having thus described the invention, I claim:

1. A method of preparing a flexible, water blown integral skin foam having improved abrasion resistance and cold flex characteristics, comprising, reacting,
   A. a diphenylmethane diisocyanate modified, with polytetrahydrofuran wherein the diisocyanates is present in a stoichiometric excess, with,
   B. polyols bearing isocyanate reactive groups, having an average functionality of at least 1.5 and further having ether linkages,
   C. water, and/or mixture of catalysts,
   D. a catalyst and/or mixture of catalyst capable of promoting urethane formation,
   E. an essentially oxo process produced linear alcohol having from 10 to about 20 carbons,
   F. a surfactant,
   G. a chain extender, and
   H. optionally additives including pigments, stabilizers and fillers.

2. A method as claimed in claim 1, wherein the diphenyl methane diisocyanate is modified by reacting with a 1000 molecular weight polytetrahydrofuran.

3. A method as claimed in claim 1, wherein the polyol is selected from the group consisting of; polyoxyalkylene polyols, graft polymer dispersions and mixtures thereof.

* * * * *